United States Patent
Perez et al.

(10) Patent No.: US 6,697,940 B1
(45) Date of Patent: Feb. 24, 2004

(54) MECHANISM TO DISABLE THE GATHERING OF TIME CONSUMING UNNECESSARY INFORMATION AT BOOTTIME

(75) Inventors: Michael Anthony Perez, Cedar Park, TX (US); Louis Gabriel Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 09/645,174

(22) Filed: Aug. 24, 2000

(51) Int. Cl.⁷ .............................................. G06F 15/177
(52) U.S. Cl. ........................................ 713/1; 710/104
(58) Field of Search ................................ 713/1, 2, 100; 709/101, 106, 222, 328; 710/8, 104

(56) References Cited

U.S. PATENT DOCUMENTS

| | | | | |
|---|---|---|---|---|
| 5,978,913 A | * | 11/1999 | Broyles et al. ................ | 713/2 |
| 6,014,744 A | * | 1/2000 | McKaughan et al. .......... | 713/2 |
| 6,092,135 A | * | 7/2000 | Kwon ........................ | 710/104 |
| 6,317,828 B1 | * | 11/2001 | Nunn ........................... | 713/2 |

FOREIGN PATENT DOCUMENTS

JP         04169929 A   *  6/1992   ............. C06F/9/06

OTHER PUBLICATIONS

IBM Technical Disclosure Bulletin—"Disk Interface Emulator for Generic SCSI Devices"–Dec. 1, 1992–vol. 35, Issue 7 pp. 248–249.*
Malcolm Weir–"EMC symmetrics VS. IBM 7133 SSA"–Nov. 14, 1997—Newsgroups: comp.arch.storage.*

* cited by examiner

*Primary Examiner*—Thomas Lee
*Assistant Examiner*—Thuan Du
(74) *Attorney, Agent, or Firm*—Duke W. Yee; Mark E. McBurney; Catherine K. Kinslow

(57) ABSTRACT

A method, system, and apparatus for customizing procedures to be performed during an initialization process in a data processing system is provided. In one embodiment, a class of procedures to omit during the initialization process is determined. This class of procedures may be for example, the omission of identifying and creating nodes for a certain class of drives, such as, for example, all ssa drives. Once procedures to omit from the initialization process are determined, then all other initialization procedures are performed except, of course, for the procedures belonging to the class of procedures determined to be omitted.

21 Claims, 4 Drawing Sheets

200 DATA PROCESSING SYSTEM

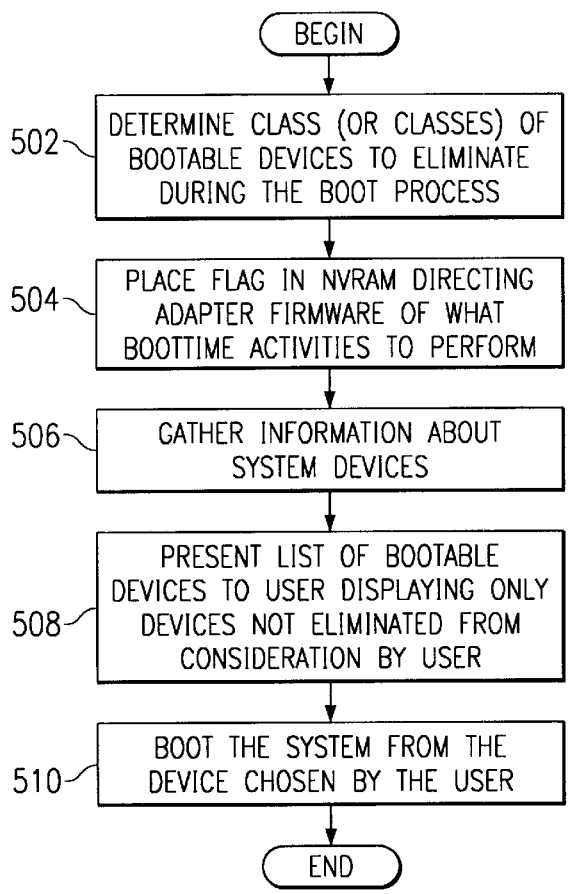

MECHANISM TO DISABLE THE GATHERING OF TIME CONSUMING UNNECESSARY INFORMATION AT BOOTTIME

BACKGROUND OF THE INVENTION

1. Technical Field

The present invention relates to an improved data processing system and, more particularly, to an improved initialization process.

2. Description of Related Art

Data processing systems (computers) have become fixtures in many aspects of modern life. For example, modern banking would be near impossible without computers to process vast amounts of transactions daily. These computers contain vast numbers of resources, such as, for example, disk drives, other input/output devices, memory components, and processors. Furthermore, with the enormous growth of the Internet, computers have found many other uses, both for business as well as personal use. The information contained on the Internet is stored on computers called web servers. Web servers, just like the computers used for banks, often contain vast numbers of resources to handle all of the web traffic to a particular web site. Booting (i.e. initializing) computers such as these often takes an enormous amount of time.

For example, in many data processing system, during the boot process, information is gathered on all the bootable devices in the data processing system. Bootable devices include scsi disks, ssa disks, tape, cd-rom and network adapters. Every time the data processing system encounters an ssa adapter, the data processing system must execute the ssa adapter's on-card firmware in which the firmware discovers all the disks attached to the ssa adapter and creates nodes for each disk since each disk is a potential bootable device. This procedure takes a long time, especially for data processing systems with 100s–1000s of ssa disks.

Later on in the boot-up, the user may access a menu and choose which of the devices from a list of bootable devices off of which to boot. This list includes all of the SSA disks along with the scsi disks, network devices, cd-rom, tape, etc. The user now must scroll through a long list of items to get to the desired item off of which to boot the data processing system. Very few users boot their data processing systems off of SSA disks. However, a large number of users utilize data processing systems that have SSA disks. Thus, the time factor becomes a human factor issue. Therefore, it would be desirable to have a method of booting a data processing system that was not as time consuming as the method currently utilized.

SUMMARY OF THE INVENTION

The present invention provides a method, system, and apparatus for customizing procedures to be performed during an initialization process in a data processing system. In one embodiment, a class of procedures to omit during the initialization process is determined. This class of procedures may be for example, the omission of identifying and creating nodes for a certain class of drives, such as, for example, all ssa drives. Once procedures to omit from the initialization process are determined, then all other initialization procedures are performed except, of course, for the procedures belonging to the class of procedures determined to be omitted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flowchart illustrating an exemplary method of customizing and executing boottime procedures in accordance with the present invention;

FIG. 6 depicts an example of a menu presented to a user for removing classes of devices from the boottime procedure in accordance with the present invention; and FIG. 7 depicts an example of a menu presenting a list of devices from which the system may be booted in accordance with the present invention.

DETAILED DESCRIPTION OF THE PREFERRED EMBODIMENT

Figure 1:
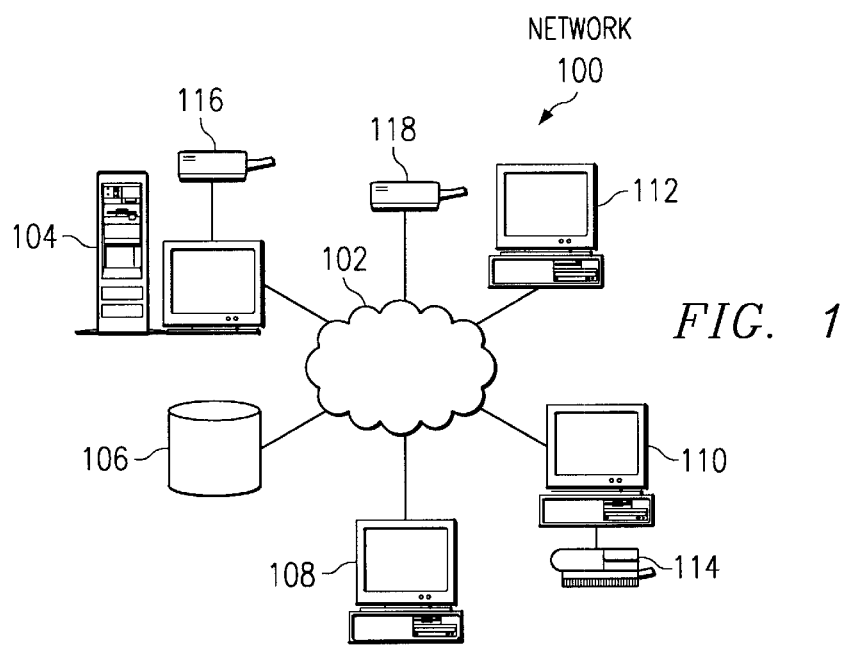
FIG. 1 depicts a pictorial representation of a distributed data processing system in which the present invention may implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
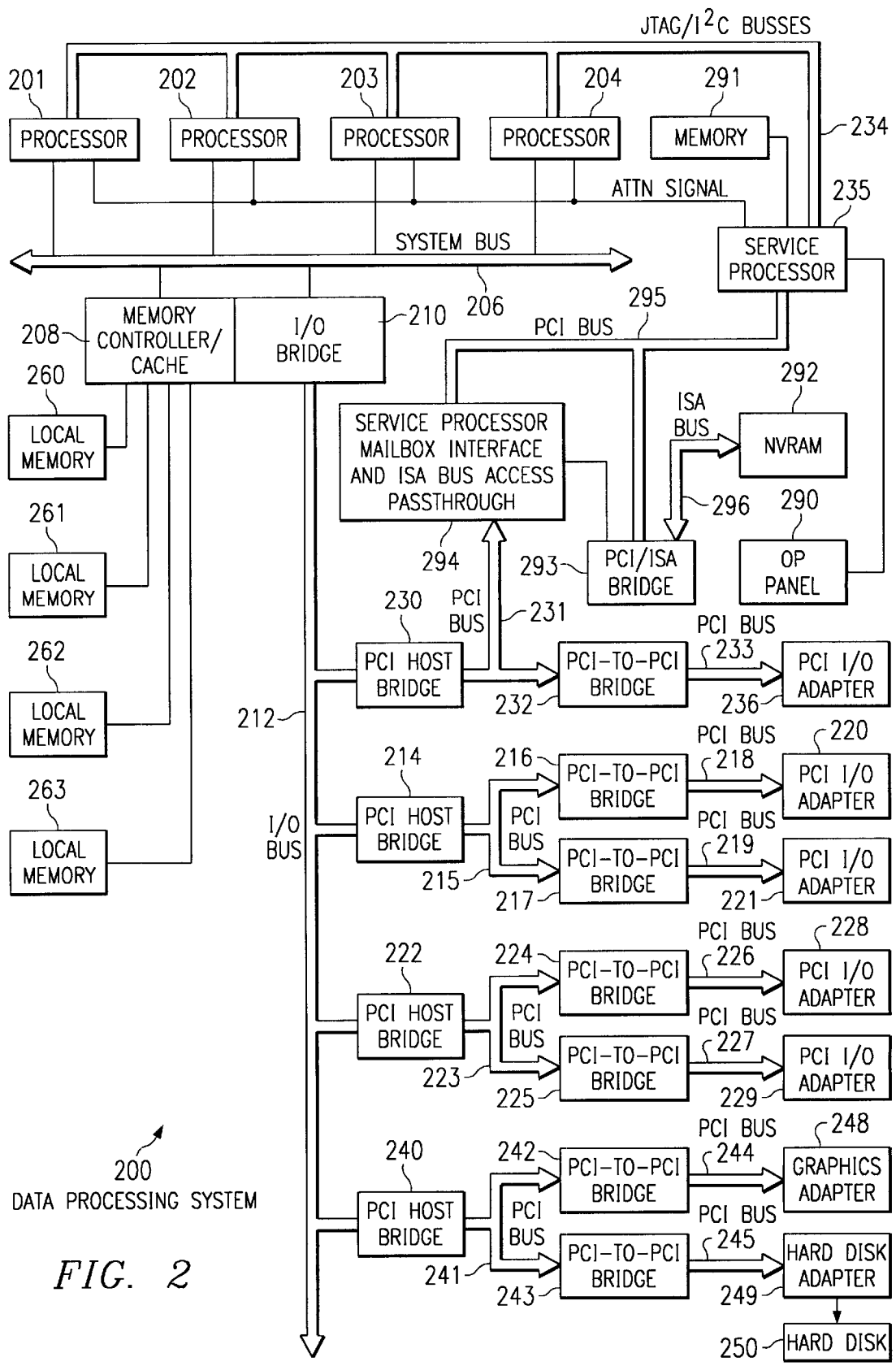
FIG. 2 depicts a block diagram of a data processing system which the present invention may be implemented.

With reference now to FIG. 2, a block diagram of a data processing system in which the present invention may be implemented is depicted. Data processing system 200 is an example of a server, such as, for example, server 104 in FIG. 1. Data processing system 200 may be a symmetric multiprocessor (SMP) system including a plurality of processors 201, 202, 203, and 204 connected to system bus 206. For example, data processing system 200 may be an IBM RS/6000, a product of International Business Machines Corporation in Armonk, New York, implemented as a server within a network. Alternatively, a single processor system may be employed. Also connected to system bus 206 is memory controller/cache 208, which provides an interface to a plurality of local memories 260–263. I/O bus bridge 210 is connected to system bus 206 and provides an interface to I/O bus 212. Memory controller/cache 208 and I/O bus bridge 210 may be integrated as depicted. An operating system, such as, for example, the Advanced Interactive Executive (AIX) operating system, a product of the International Business Machines Corporation of Armonk, New York, may run on data processing system 100.

Peripheral component interconnect (PCI) Host bridge 214 connected to I/O bus 212 provides an interface to PCI local bus 215. A number of Input/Output adapters 220–221 may be connected to PCI bus 215 through a respective one of PCI-to-PCI bridges 116–217 via a respective one of PCI buses 118–219. Typical PCI bus implementations will support between four and eight I/O adapters (i.e. expansion slots for add-in connectors). Each I/O Adapter 220–221 provides an interface between data processing system 200 and input/output devices such as, for example, other network computers, which are clients to data processing system 200.

An additional PCI host bridge 222 provide an interface for an additional PCI bus 223. PCI bus 223 is connected to a plurality of PCI-to-PCI bridges 124–225 which are in turn each connected to a respective one of PCI I/O adapters 228–229 by a respective one of PCI buses 226–227. Thus, additional I/O devices, such as, for example, modems or network adapters may be supported through each of PCI I/O adapters 228–229. In this manner, data processing system 200 allows connections to multiple network computers. Each of PCI-to-PCI bridges 116–217, 124–225, 142–243, and 132 is connected to a single I/O adapter. A memory mapped graphics adapter 248 may be connected to I/O bus 212 through PCI Host Bridge 240 and PCI-to-PCI Bridge 242 via PCI buses 241 and 244 as depicted. A hard disk 250 may also be connected to I/O bus 212 through PCI Host Bridge 240 and PCI-to-PCI Bridge 242 via PCI buses 241 and 245 as depicted.

A PCI host bridge 230 provides an interface for a PCI bus 231 to connect to I/O bus 212. PCI bus 231 connects PCI host bridge 230 to the service processor mailbox interface and ISA bus access passthrough logic 294 and PCI-to-PCI Bridge 232. The ISA bus access passthrough logic 294 forwards PCI accesses destined to the PCI/ISA bridge 293. The NV-RAM storage is connected to the ISA bus 296. The Service processor 235 is coupled to the service processor mailbox interface 294 through its local PCI bus 295.

Service processor 235 is also connected to processors 201–204 via a plurality of JTAG/I²C buses 234. JTAG/I²C buses 234 are a combination of JTAG/scan busses (see IEEE 1149.1) and Phillips I²C busses. However, alternatively, JTAG/I²C buses 234 may be replaced by only Phillips I²C busses or only JTAG/scan busses. All SP-ATTN signals of the host processors 201, 202, 203, and 204 are connected together to an interrupt input signal of the service processor. The service processor 235 has its own local memory 291, and has access to the hardware op-panel 290. Service processor 235 is responsible for saving and reporting error information related to all the monitored items in data processing system 200. Service processor 235 also takes action based on the type of errors and defined thresholds.

Some or all or PCI I/O adapters 120–221, 128–229, 136, and 148–249 may be Small Computer System Interface (SCSI) and/or Serial Storage Architecture (SSA) adapters and be connected to SCSI and/or SSA devices. SSA is a peripheral interface from the International Business Machines Corporation that transfers data at a rate of up to 80 Mbytes/sec. SSA 160 increases the rate to 160 MBps. SSA's ring configuration allows remaining devices to function if one fails. SCSI software can be mapped over SSA allowing existing SCSI devices to be used. While distances of SCSI cables are measured in feet, SSA cable can be up to 25 meters over copper and 2.4 kilometers over fiber.

SCSI (pronounced "scuzzy") is a hardware interface that allows for the connection of up to seven (7) to fifteen (15) peripheral devices to a single expansion board that plugs into the computer called a "SCSI host adapter" or "SCSI controller." SCSI peripherals are daisy chained together, and all devices have a second port that is used to connect the next device in line. Single SCSI boards are also available with two controllers and support up to 30 peripherals.

Some or all or PCI I/O adapters 120–221, 128–229, 136, and 148–249 may also be implemented using FC-AL (Fibre Channel-Arbitrated Loop) technology or using IDE adapters. FC-AL is a topology for Fibre Channel in which all devices are linked together in a loop. Fibre Channel is a high-speed transmission technology that can be used as a front-end communications network, a back-end storage network, or both at the same time. Fibre Channel is a driving force in the storage area network (SAN) arena for connecting multiple hosts to dedicated storage systems. IDE (Integrated Drive Electronics) is a type of hardware interface widely used to connect hard disks, CD-ROMs and tape drives to a data processing system.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
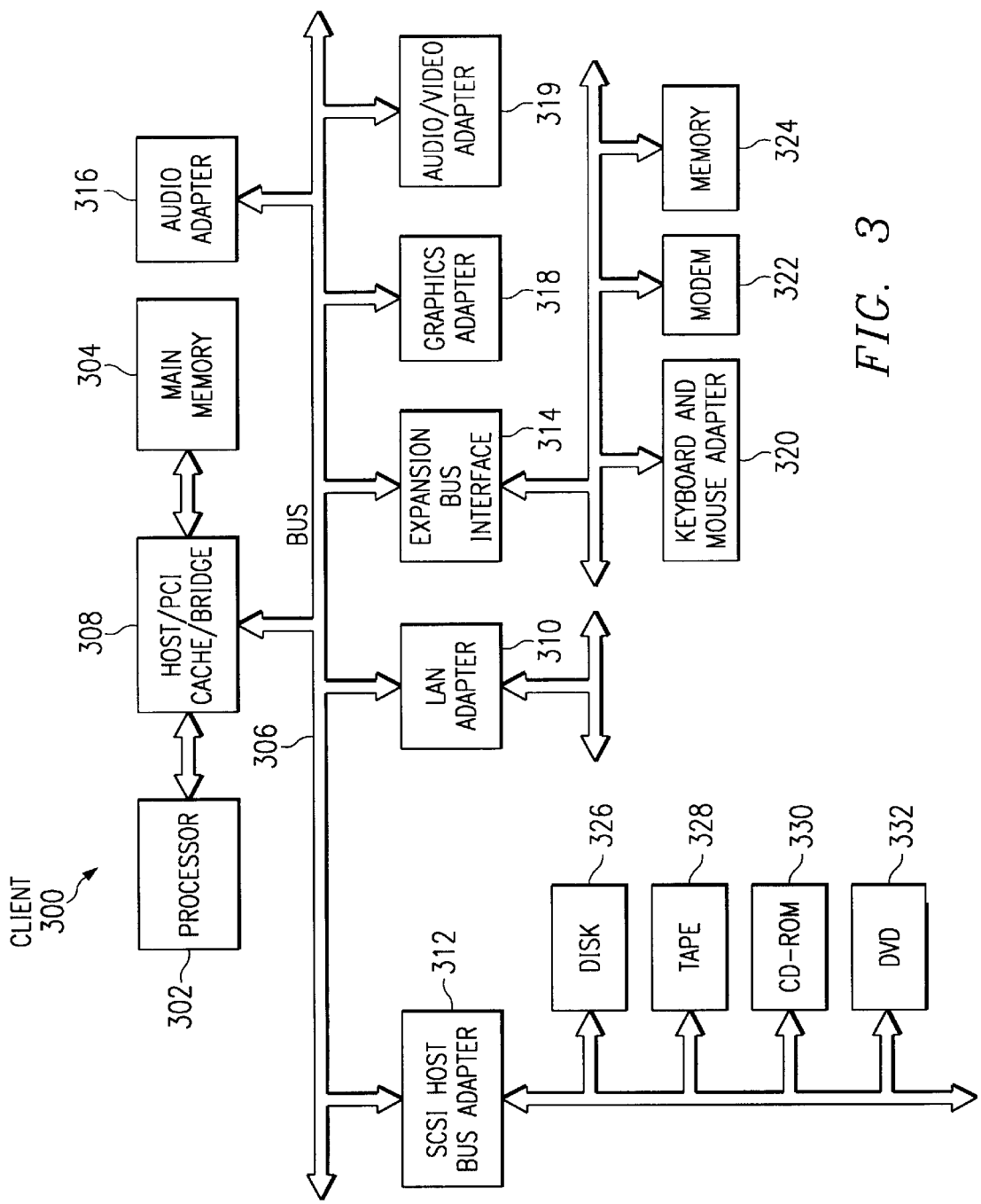
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and a audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
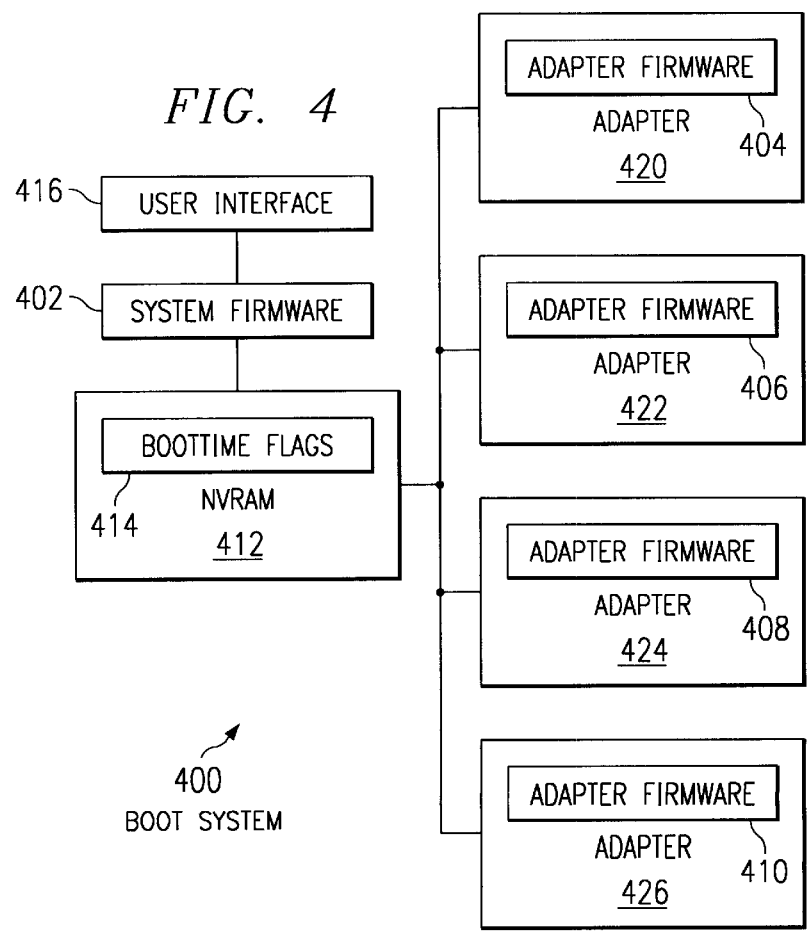
FIG. 4 depicts a block diagram illustrating a system for selectively gathering information during boottime in accordance with the present invention.

With reference now to FIG. 4, a block diagram illustrating a system for selectively gathering information during boottime is depicted in accordance with the present invention. Boottime is the period of time in which the data processing system's resources are initialized and the operating system instructions are loaded into system memory. Boottime occurs, for example, when power is first provided to the data processing system. The operating system instructions are obtained from a bootable drive, thus booting the data processing system. However, other functions are also performed during the booting procedure including identifying which resources are available to the data processing system and whether the devices appear to be functioning correctly. Other processes are also performed during this time are often also considered part of the boot process. Booting is also sometimes referred to as an Initial Program Load (IPL).

There may be more than one drive within the data processing system (or the network) from which the data processing system may boot. For example, each of PCI I/O adapters 220–221, 228–229, and 236 in FIG. 2 may be connected to a bootable drive. Hard disk 250 in FIG. 2 may also be a bootable drive. Furthermore, although, typically, the data processing system is booted from a bootable device connected directly to the data processing system, the bootable drive may be located on another computer within a network, such as a drive on client 108 in network 100 for booting server 104 in FIG. 1.

Boot system 400 may be implemented within a data processing system, such as, for example, data processing system 200 in FIG. 2. Boot system 400 includes system firmware 402 for executing initialization procedures for the data processing system, a user interface 416 for providing information to and receiving information from a user, and a NVRAM 412 for storing boot flags 414 for informing each of adapter firmware 404–410 which boottime processes to execute and which boottime processes to omit. The instructions for system firmware 402 may be stored in a non-volatile memory device such as, for example, a ROM or NVRAM. For example, the instructions for executing system firmware 402 may be stored in NVRAM 292 in FIG. 2 and may be executed within a processor, such as, for example, service processor 235 in FIG. 2.

User interface 416 may include a video display terminal for presenting information to a user and a keyboard and/or mouse for receiving information from a user. NVRAM 412 may be implemented as, for example, NVRAM 292 in FIG. 2. Each of adapters 420–426 may be implemented as one of PCI I/O adapters 220–221, 228–229, and 236 or as hard disk adapter 249 in FIG. 2. One or more of adapters 420–426 may also be implemented as an adapter connected to a networked computer, such as, to one of clients 108–112 in FIG. 1. However, in some embodiments, none of the bootable devices for the data processing system are connected to remote computers.

Each of adapters 404–426 contains its own adapter firmware 404–410 which performs adapter specific processes during the boot process. Each of adapter firmware 404–410, unless directed otherwise, discovers all the disk attached to the particular one of adapters 420–426 and creates nodes to each disk since each disk is a potential bootable device.

System firmware 402 receives from user interface 416 a selection of devices and/or procedures to omit during the booting of the data processing system. System firmware 402 then sets a flag in boottime flags 414 indicating which class of devices or processes that each of adapters 420–426 should omit during the boot process. During boottime, adapter firmware 404–410 consults boottime flags 414 to determine which of its boottime procedures to omit. Each adapter firmware 404–410 will then only perform the other boottime procedures necessary to make the adapter usable as well as any procedures not omitted.

For example, if a user has selected to omit discovering all ssa disks, then each of adapter firmware 404–410 that corresponds to an ssa adapter will omit discovering all ssa disks attached to its adapter. This eliminates the time consuming task of discovering all ssa disks attached to various adapters and creating node for each ssa disk. Thus, although each ssa disk is a potential bootable disk, users very seldom boot from an ssa disk. Therefore, by eliminating the discovery and node creation of each ssa disk in the system, the menu of devices off of which the user may boot may be narrowed down to a much smaller and more manageable number.

Those of ordinary skill in the art will appreciate that the hardware in FIG. 4 may vary depending on the implementation. For example, more or fewer adapters may be used than depicted in FIG. 4. Furthermore, some adapters may not have adapter firmware, in which case, no actions are needed from those adapters. The depicted example is not meant to imply architectural limitations with respect to the present invention.

With reference now to FIG. 5, a flowchart illustrating an exemplary method of customizing and executing boottime procedures is depicted in accordance with the present invention. To begin, system firmware determines a class (or classes) of bootable devices or procedures to eliminate during the boot process (step 502). An example of a menu presented to a user for removing classes of devices from the boottime procedure is depicted in FIG. 6 in accordance with the present invention. Menu 600 allows a user to select one or more of items 1–4 to be removed from boottime activity. If a class of devices, such as, for example, item 2 SSA, is selected, then all the procedures necessary to enable the adapters to which that class of devices are connected are performed. However, each particular drive is not identified and a node is not created, thus saving valuable time.

Menu 600 is an example of a menu by which a user may select a class of devices to be removed from consideration as a device from which to boot the system. However, other types of menus may be used as well. Furthermore, a menu may be presented to the user showing more or fewer classes of devices to be removed from consideration or other boottime procedures that should be eliminated because a user has determined them not to be necessary. Also, a user may select a procedure(s) to be eliminated from the boottime procedures using a command line interface rather than a menu.

Once the procedure(s) to be eliminated have been determined, a flag is then placed in NVRAM directing each adapter firmware of which boottime activities to omit from execution during the boot procedure (step 504). Information about system devices as well as other initialization procedures are then performed, including those performed by adapter firmware, but omitting those procedures selected earlier by the user (step 506). A list of devices from which the system may be booted is then presented to the user (step 508). An example of a menu presenting a list of devices from which the system may be booted is depicted in FIG. 7 in accordance with the present invention. The list contains all bootable devices within the system identified during the previous initialization procedures. For example, menu 700 contains a list of four devices from which a user may select one as the device from which to boot the data processing system. Once a device has been selected by the user, the system is booted from the device chosen by the user (step 510).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of customizing procedures to perform during an initialization process in a data processing system; the method comprising:

presenting a user with a list of procedures to be performed during the initialization process;

receiving a user input for determining, from the list of procedures to be performed, a class of procedures to omit during the initialization process, wherein the class of procedures to be omitted is identifying drives and creating nodes for a plurality of drives corresponding to a selected class of drives; and performing all initialization procedures except for the procedures belonging to the class of procedures determined to be omitted.

2. The method as recited in claim 1, further comprising:

prior to the step of performing all initialization procedures, placing a flag in a memory device indicating to an adapter firmware which procedures to omit from the adapter firmware's initialization procedures.

3. The method as recited in claim 2, wherein the memory device is a non-volatile random access memory.

4. The method as recited in claim 1, wherein the class of drive comprises Serial Storage Architecture disks.

5. The method as recited in claim 1, wherein the class of drives comprises Small Computer System Interface disks.

6. The method as recited in claim 1, wherein the class of drives comprises Fibre Channel-Arbitrated Loop disks.

7. The method as recited in claim 1, further comprising:

presenting a user with a list of drives from which the data processing system may be booted, wherein the list does not contain the selected class of drives; and booting the data processing system from a one of drives from the list of drives.

8. A computer program product in a computer readable media for use in a data processing system for customizing procedures to perform during an initialization process in the data processing system; the computer program product comprising:

first instructions for presenting a user with a list of procedures to be performed during the initialization process;

second instructions for receiving a user input for determining, from the list of procedures to be performed, a class of procedures to omit during the initialization process, wherein the class of procedures to be omitted is identifying drives and creating nodes for a plurality of drives corresponding to a selected class of drives; and third instructions for performing all initialization procedures except for the procedures belonging to the class of procedures determined to be omitted.

9. The computer program product as recited in claim 8, further comprising:

fourth instructions, prior to the second instructions, for placing a flag in a memory device indicating to an adapter firmware which procedures to omit from the adapter firmware's initialization procedures.

10. the computer program product as recited in claim 9, wherein the memory device is a non-volatile random access memory.

11. The computer program product as recited in claim 8, wherein the class of drive comprises Serial Storage Architecture disks.

12. The computer program product as recited in claims 8, wherein the class of drives comprises Small Computer System Interface disks.

13. The computer program product as recited in claim 8, wherein the class of drives comprises Fibre Channel-Arbitrated Loop disks.

14. The computer program product as recited in claim 8, further comprising:

fourth instructions for presenting a user with a list of drives from which the data processing system may be booted, wherein the list does not contain the selected class of drives; and fifth instructions for booting the data processing system from a one of drives from the list of drives.

15. A system for customizing procedures to perform during an initialization process in a data processing system; the system comprising:

first means for presenting a user with a list of procedures to be performed during the initialization process;

second means for receiving a user input for determining, from the list of procedures to be performed, a class of procedures to omit during the initialization process, wherein the class of procedures to be omitted is identifying drives and creating nodes for a plurality of drives corresponding to a selected class of drives; and third means for performing all initialization procedures except for the procedures belonging to the class of procedures determined to be omitted.

16. The system as recited in claim 15, further comprising:

fourth means, prior to the second means, for placing a flag in a memory device indicating to an adapter firmware which procedures to omit from the adapter firmware's initialization procedures.

17. The system as recited in claim 16, wherein the memory device is a non-volatile random access memory.

18. The system as recited in claim 15, wherein the class of drive comprises Serial Storage Architecture disks.

19. The system as recited in claim 15, wherein the class of drives comprises Small Computer System Interface disks.

20. The system as recited in claim 15, wherein the class of drives comprises Fibre Channel-Arbitrated Loop disks.

21. The system as recited in claim 15, further comprising:

fourth means for presenting a user with a list of drives from which the data processing system may be booted, wherein the list does not contain the selected class of drives; and fifth means for booting the data processing system from a one of drives from the list of drives.

\* \* \* \* \*

UNITED STATES PATENT AND TRADEMARK OFFICE
CERTIFICATE OF CORRECTION

PATENT NO. : 6,697,940 B1
APPLICATION NO. : 09/645174
DATED : February 24, 2004
INVENTOR(S) : Perez et al.

Page 1 of 1

It is certified that error appears in the above-identified patent and that said Letters Patent is hereby corrected as shown below:

On Title Page
item (74) Attorney, Agent, or Firm: delete "Catherine K. Kinslow" and insert --Cathrine K. Kinslow--.

Col. 8, line 63: before "computer" delete "the" and insert --The--.

Col. 9, line 12: before "instructions" delete "fourth" and insert --fifth--.

Col. 9, line 16: before "instructions" delete "fifth" and insert --sixth--.

Col. 10, line 20: before "means" delete "fourth" and insert --fifth--.

Col. 10, line 24: before "means" delete "fifth" and insert --sixth--.

Signed and Sealed this

Fourteenth Day of November, 2006

JON W. DUDAS
*Director of the United States Patent and Trademark Office*